UNITED STATES PATENT OFFICE.

JOSEPH PIERRE LAVOIE, OF MONTREAL, QUEBEC, CANADA.

CROSSHEAD.

1,424,925.  Specification of Letters Patent.  Patented Aug. 8, 1922.

Application filed April 21, 1921. Serial No. 463,173.

*To all whom it may concern:*

Be it known that I, JOSEPH PIERRE LAVOIE, a British subject, residing at 2689 Notre Dame Street East, in the city of Montreal, in the Province of Quebec, in the Dominion of Canada, have invented certain new and useful Improvements in Crossheads; and I do hereby declare that the following is a clear, true, and correct description of the same.

The present invention relates to improvements in cross heads, and means for lubricating the same, and its main object is to provide means for adjusting or centering the connecting rod.

Another object is to provide lubricating means in said cross heads.

To properly understand the invention reference should be had to the following description and accompanying drawings, in which.

Like numerals of reference indicate corresponding parts in each figure.

Figure 1:
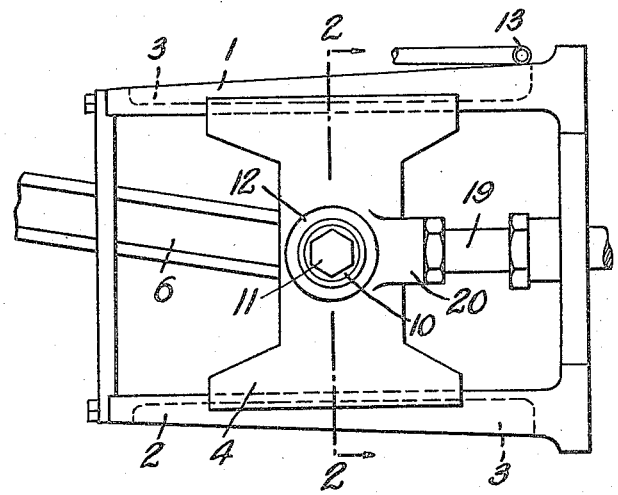
Figure 1 is a side elevation of the cross head and guide.
Figure 2:
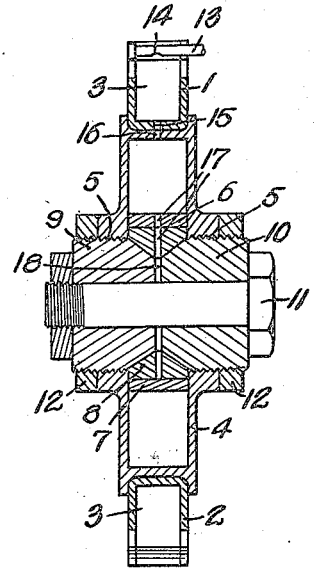
Figure 2 is a cross section on line 2—2 in Figure 1.

Referring to the drawings, 1 and 2 are respectively the upper and lower guides which are preferably secured to the cylinder head by any suitable means. Both guides are provided with a central longitudinal channel or recess 3 the primary purpose of which is to reduce the weight and material. In between said guides 1 and 2 the hollow cross head 4 is slidably mounted. As usual, the cross head is provided at opposite sides with alining horizontal transverse holes 5. The connecting rod 6 fits in said cross head and is provided with a hole 7 adapted to register with the transverse holes 5. The said hole 7 is lined with a bushing 8 of any suitable material, of conical shape. The piston rod 19 is rigidly secured in the usual socket 20 formed on the cross head.

In order that the connecting rod may always be centered, two frusto-conical plugs 9 and 10 are threaded in the holes 5 and made to engage opposite sides of the conical bushing 8. By screwing one or the other of said plugs 9 and 10, the connecting rod can readily be adjusted. The plugs 9 and 10 are centrally perforated to receive the securing bolt 11, and 12 are lock nuts adapted to securely hold the plugs 9 and 10 in place.

The different parts of the cross head, including the piston and connecting rod are preferably lubricated by means of an oil pipe 13 which is supplied from any suitable source. The pipe 13 has one or more holes 14 which overlie the channel 3 in the upper guide 1. The bottom of said channel 3 is provided with a plurality of holes 15. The channel 3 thus forms an oil well and the oil therein will pass through the holes 15. The holes are so bored that the oil will drop on the piston rod. The cross head 4 which slides in said guides will continually oil itself, and one or more holes 16 are provided through the recessed portion of said cross head, thus allowing the oil to enter in between the side of the cross head. The end of the connecting rod 6 and the bushing 7 are also provided with holes 17 through which the oil will enter, dropping in the well or space 18 formed between the two frusto-conical plugs 9 and 10, thus thoroughly oiling the bolt 11. By providing these holes or passages, every part of the cross head will be perfectly lubricated.

What I claim as my invention is:

1. In a cross head in combination, a pair of guides, each having a longitudinal channel therein, one guide having a plurality of holes formed in the bottom thereof; a cross head slidably mounted on said guides and formed with a hole, a connecting rod having a conical hole adjacent one end; and frusto-conical members engaged in said conical hole and spaced from each other to form an intermediate recess, said connecting rod having a hole therein communicating with said recess.

2. In a cross head, the combination of a pair of spaced guides, one of which is provided with a longitudinal channel having a plurality of lubricant-discharge holes formed in its bottom; a hollow cross head slidably mounted on said guides and provided with inlet holes to receive lubricant from the first-named holes; a connecting rod having one end inserted in the interior of the cross head; and centering members for said rod engaged in the opposite sides of said cross head and spaced apart at their inner ends to provide an intermediate recess, the inserted end of said rod having a hole which communicates with said recess.

3. In combination, a pair of spaced guides; a hollow cross head slidably mounted on said guides and having its opposite ends shaped to conformably engage the same, said cross head being provided at opposite sides with a pair of threaded transverse openings; a connecting rod having one end inserted in the interior of the cross head and provided with an opening; a pair of centering members engaged in said threaded openings and having frusto-conical inner ends which project into the opening in said rod end, said centering members being formed with alining axial passages; a bushing ring of V-section lining said rod opening and conformably encircling the frusto-conical ends of said centering members; and a fastening bolt inserted through said passages to couple the cross head, centering members and connecting rod together.

Signed at Montreal, Quebec, Canada, this 8th day of April, 1921.

JOSEPH PIERRE LAVOIE.

Witnesses:
C. PATENAUDE,
G. BEAUDOIN.